(12) United States Patent
Yokosawa

(10) Patent No.: US 6,278,265 B1
(45) Date of Patent: Aug. 21, 2001

(54) SWITCHING REGULATOR

(75) Inventor: Kouji Yokosawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/626,150

(22) Filed: Jul. 26, 2000

(30) Foreign Application Priority Data

Jul. 26, 1999 (JP) .................................................. 11-210753

(51) Int. Cl.[7] .................................................. G05F 1/563
(52) U.S. Cl. .......................................................... 323/282
(58) Field of Search ................................... 323/265, 282, 323/285, 289, 222, 351

(56) References Cited

U.S. PATENT DOCUMENTS

| | | | | |
|---|---|---|---|---|
| 5,770,940 | * | 6/1998 | Goder | 323/282 |
| 5,966,003 | * | 10/1999 | Takimoto et al. | 323/224 |
| 5,982,160 | * | 11/1999 | Walters et al. | 323/282 |
| 6,127,815 | * | 10/2000 | Wilcox | 323/282 |
| 6,160,388 | * | 12/2000 | Skelton et al. | 323/282 |

* cited by examiner

Primary Examiner—Adolf Deneke Berhane
(74) Attorney, Agent, or Firm—Young & Thompson

(57) ABSTRACT

The present invention provides a switching regulator: a switching circuit for switching a transmission of an input voltage to an output terminal; a control circuit connected to the switching device for sending a control pulse signal to the switching circuit, so that the switching circuit switches the transmission of the input voltage on the basis of the control pulse signal; and a pulse width varying circuit connected to the control circuit for varying a pulse width of the control pulse signal from the control circuit.

24 Claims, 9 Drawing Sheets

SWITCHING REGULATOR

BACKGROUND OF THE INVENTION

The present invention relates to a switching regulator, and more particularly to a switching regulator suitable for mobile devices such as mobile phones, and note-type personal computers.

The requirements for size-down and weight reduction of mobile devices such as mobile phones, and note-type personal computers have been on the increase. In order to realize the above requirements, it is effective to reduce the number of batteries mounted on the mobile device and to use a power circuit provided therein, wherein a booster switching regulator is often used. For the power circuit using a series regulator, a voltage-down switching regulator may be used in view of a high efficiency.

FIG. 1 is a circuit diagram illustrative of a first conventional switching regulator. FIG. 2 is a diagram illustrative of waveforms of j-point potential, f-point potential, d-point potential and g-point output of the first conventional switching regulator of FIG. 1. The first conventional switching regulator is of a pulse width modulation system wherein in place of simple comparison of a reference voltage to a comparative voltage, a potential difference between the reference voltage and the comparative voltage is amplified to obtain an amplified voltage, so that the amplified voltage is then compared with an output voltage of a triangle waveform by use of a comparator, whereby ON-OFF operations of switching transistors are made in accordance with a result of an output from the comparator.

Namely, the first conventional switching regulator has the following circuit elements. A power source 14 is provided for supplying a reference voltage to the first conventional switching regulator. An error-amplifier 19 is provided which has two inputs connected to an f-point which is connected to the power source 14 for receiving the reference voltage from the power source 14 and also connected to a d-point for receiving a comparative voltage, so that the error-amplifier 19 amplifies a difference in potential between the f-point and the d-point namely between the reference voltage from the power source 14 and the comparative voltage at the d-point to generate an amplified potential difference. A triangle-waveform generator 18 is also provided for generating a triangle waveform. The triangle-waveform generator 18 is connected to an h-point. A comparator 12 is also provided which has two inputs connected through the h-point to the triangle-waveform generator 18 for receiving the triangle waveform from the triangle-waveform generator 18 and also connected through a j-point to an output from the error-amplifier 19 for receiving the amplified potential difference from the error-amplifier 19, so that the comparator 12 compares the amplified potential difference with the triangle waveform. The comparator 12 has an output terminal connected to a g-point. A series connection of a p-channel output switching transistor 10 and an n-channel output switching transistor 9 is provided between an input terminal IN1 and a ground line, wherein the p-channel output switching transistor 10 is connected in series between the input terminal IN1 and the n-channel output switching transistor 9, whilst the n-channel output switching transistor 9 is connected in series between the ground line and the p-channel output switching transistor 10. Gates of the p-channel output switching transistor 10 and the n-channel output switching transistor 9 are connected through the g-point to the output terminal of the comparator 12. A k-point is a middle point between the p-channel output switching transistor 10 and the n-channel output switching transistor 9. A coil 5 is connected in series between the k-point and an output terminal OUT2. A load 3 is further provided which is connected between the output terminal OUT2 and the ground line, so that the load 3 is connected in series through the output terminal OUT2 to the coil 5. A capacitor 4 is also provided which is connected between the output terminal OUT2 and the ground line, so that the capacitor 4 is connected in series through the coil 5 to the k-point and also connected in series through the output terminal OUT2 to the load 3. A series connection of first and second resistances 7 and 8 is also connected between the ground line and a middle point between the coil 5 and the output terminal OUT2, so that the series connection of first and second resistances 7 and 8 is connected through the output terminal OUT2 to the load 3 and also connected through the coil 5 to the k-point. An intermediate point between the first and second resistances 7 and 8 is also connected through the d-point to the error-amplifier 19, so that the intermediate point between the first and second resistances 7 and 8 supplies the comparative voltage to the error-amplifier 19. The first resistance 7 is connected between the second resistance and the intermediate point between the coil 5 and the output terminal OUT2, whilst the second resistance 8 is connected between the ground line and the first resistance 7.

A potential difference between the reference voltage supplied through the f-point from the power source 14 and the comparative voltage supplied through the d-point from the intermediate point between the first and second resistances 7 and 8 is amplified by the error amplifier 19 to obtain an amplified potential difference, so that the amplified potential difference is then compared with the output voltage of the triangle waveform supplied through the h-point from the triangle waveform generator 18 by the comparator 12, whereby ON-OFF operations of the p-channel and n-channel switching transistors 10 and 9 are made in accordance with a result of the output from the comparator 12, wherein a duty ratio of the output waveform at the g-point connected to the output terminal of the comparator 12 is variable to realize a precise control thereof, whereby an output voltage with a small ripple appears at the output terminal OUT2.

The above first conventional switching regulator has the following disadvantages. The triangle waveform generator 18 and the error-amplifier 19 are essential for the above first conventional switching regulator. Further, a protection circuit is also necessary when the h-point potential and the g-point potential are outside the comparable range. This means that it is difficult to scale-down the circuit configuration of the first conventional switching regulator, and also that the circuit configuration is complicated whereby the power consumption is large. The efficiency of the voltage transformation as the power source circuit is also deteriorated.

FIG. 3 is a circuit diagram illustrative of a second conventional switching regulator. The second conventional switching regulator is of a pulse frequency modulation system wherein in place of simple comparison of a reference voltage to a comparative voltage, a potential difference between the reference voltage and the comparative voltage is amplified to obtain an amplified voltage, so that the amplified voltage is then compared with an output voltage of a triangle waveform by use of a comparator, whereby ON-OFF operations of a single switching transistor are made in accordance with a result of an output from the comparator.

Namely, the second conventional switching regulator has the following circuit elements. A power source 14 is provided for supplying a reference voltage to the first conventional switching regulator. An error-amplifier 19 is provided which has two inputs connected to an f-point which is connected to the power source 14 for receiving the reference voltage from the power source 14 and also connected to a d-point for receiving a comparative voltage, so that the error-amplifier 19 amplifies a difference in potential between the f-point and the d-point namely between the reference voltage from the power source 14 and the comparative voltage at the d-point to generate an amplified potential difference. A triangle-waveform generator 18 is also provided for generating a triangle waveform. The triangle-waveform generator 18 is connected to an h-point. A comparator 12 is also provided which has two inputs connected through the h-point to the triangle-waveform generator 18 for receiving the triangle waveform from the triangle-waveform generator 18 and also connected through a j-point to an output from the error-amplifier 19 for receiving the amplified potential difference from the error-amplifier 19, so that the comparator 12 compares the amplified potential difference with the triangle waveform. The comparator 12 has an output terminal connected to a point. A series connection of a coil 5 and an n-channel output switching transistor 9 is provided between an input terminal IN1 and a ground line, wherein the coil 5 is connected in series between the input terminal IN1 and the n-channel output switching transistor 9, whilst the n-channel output switching transistor 9 is connected in series between the ground line and the coil 5. A gates of the n-channel output switching transistor 9 is connected through the g-point to the output terminal of the comparator 12. A k-point is a middle point between the coil 5 and the n-channel output switching transistor 9. A diode 6 is connected in series between the k-point and an output terminal OUT2. A load 3 is further provided which is connected between the output terminal OUT2 and the ground line, so that the load 3 is connected in series through the output terminal OUT2 to the diode 6. A capacitor 4 is also provided which is connected between the output terminal OUT2 and the ground line, so that the capacitor 4 is connected in series through the diode 6 to the k-point and also connected in series through the output terminal OUT2 to the load 3. A series connection of first and second resistances 7 and 8 is also connected between the ground line and a middle point between the diode 6 and the output terminal OUT2, so that the series connection of first and second resistances 7 and 8 is connected through the output terminal OUT2 to the load 3 and also connected through the diode 6 to the k-point. An intermediate point between the first and second resistances 7 and 8 is also connected through the d-point to the error-amplifier 19, so that the intermediate point between the first and second resistances 7 and 8 supplies the comparative voltage to the error-amplifier 19. The first resistance 7 is connected between the second resistance and the intermediate point between the diode 6 and the output terminal OUT2, whilst the second resistance 8 is connected between the ground line and the first resistance 7.

A potential difference between the reference voltage supplied through the f-point from the power source 14 and the comparative voltage supplied through the d-point from the intermediate point between the first and second resistances 7 and 8 is amplified by the error amplifier 19 to obtain an amplified potential difference, so that the amplified potential difference is then compared with the output voltage of the triangle waveform supplied through the h-point from the triangle waveform generator 18 by the comparator 12, whereby ON-OFF operations of the n-channel switching transistor 9 are made in accordance with a result of the output from the comparator 12, wherein a duty ratio of the output waveform at the g-point connected to the output terminal of the comparator 12 is variable to realize a precise control thereof, whereby an output voltage with a small ripple appears at the output terminal OUT2.

The above second conventional switching regulator has the following disadvantages. The triangle waveform generator 18 and the error-amplifier 19 are essential for the above first conventional switching regulator. Further, a protection circuit is also necessary when the h-point potential and the g-point potential are outside the comparable range. This means that it is difficult to scale-down the circuit configuration of the first conventional switching regulator, and also that the circuit configuration is complicated whereby the power consumption is large. The efficiency of the voltage transformation as the power source circuit is also deteriorated.

FIG. 4 is a circuit diagram illustrative of a third conventional switching regulator. The third conventional switching regulator is of a pulse frequency modulation system wherein a potential difference between the reference voltage and the comparative voltage are compared with each other by use of a comparator, and an output from the comparator and an output voltage of a triangle waveform are inputted into a logic gate, for example, an AND-gate, whereby ON-OFF operations of a single switching transistor are made in accordance with an output from the logic gate, for example, the AND-gate.

Namely, the third conventional switching regulator has the following circuit elements. A power source 14 is provided for supplying a reference voltage to the first conventional switching regulator. A comparator 12 is provided which has two inputs connected to an f-point which is connected to the power source 14 for receiving the reference voltage from the power source 14 and also connected to a d-point for receiving a comparative voltage, so that the comparator 12 compares the reference voltage from the power source 14 and the comparative voltage at the d-point to generate an output. An oscillator 13 is also provided for generating a pulse waveform. The oscillator 13 is connected to a b-point. An AND-gate 11 is also provided which has two inputs connected through the b-point to the oscillator 13 for receiving the pulse-waveform from the oscillator 13 and also connected through a c-point to an output from the comparator 12 for receiving the output from the comparator 12, so that the AND-gate 11 performs the AND-operation of the pulse from the oscillator 13 and the output from the comparator 12. A series connection of a coil 5 and an n-channel output switching transistor 9 is provided between an input terminal IN1 and a ground line, wherein the coil 5 is connected in series between the input terminal IN1 and the n-channel output switching transistor 9, whilst the n-channel output switching transistor 9 is connected in series between the ground line and the coil 5. A gates of the n-channel output switching transistor 9 is connected through the a-point to the output terminal of the AND gate 11. A k-point is a middle point between the coil 5 and the n-channel output switching transistor 9. A diode 6 is connected in series between the k-point and an output terminal OUT2. A load 3 is further provided which is connected between the output terminal OUT2 and the ground line, so that the load 3 is connected in series through the output terminal OUT2 to the diode 6. A capacitor 4 is also provided which is connected between the output terminal OUT2 and the ground line, so that the capacitor 4 is connected in series through the diode 6 to the k-point and also connected in series through the output terminal OUT2 to the load 3. A series connection of first and second resistances 7 and 8 is also connected between the ground line and a middle point between the diode 6 and the output terminal OUT2, so that the series connection of first and second resistances 7 and 8 is connected through the output terminal OUT2 to the load 3 and also connected through the diode 6 to the k-point. An intermediate point between the first and second resistances 7 and 8 is also connected through the d-point to the comparator 12, so that the intermediate point between the first and second resistances 7 and 8 supplies the comparative voltage to the comparator 12. The first resistance 7 is connected between the second resistance and the intermediate point between the diode 6 and the output terminal OUT2, whilst the second resistance 8 is connected between the ground line and the first resistance 7.

A potential difference between the reference voltage supplied through the f-point from the power source 14 and the comparative voltage supplied from through the d-point from the intermediate point between the first and second resistances 7 and 8 are compared with each other by use of the comparator 12, and an output from the comparator 12 and an output voltage of the triangle waveform supplied through the b-point from the oscillator 13 are inputted into the logic gate, for example, the AND-gate 11, whereby ON-OFF operations of the single switching transistor 9 are made in accordance with an output from the logic gate, for example, the AND-gate 11.

The above third conventional switching regulator is of the pulse frequency modulation system, where the control to the output voltage is made in accordance with the number of the pulses, for which reason the circuit configuration is relatively simple, and the efficiency of voltage transformation as the power source circuit is also relatively high. However, the above third conventional switching regulator has the following disadvantages. The control to the output voltage is not precise as compared to the above pulse width modulation system. This means that the output voltage has a relatively large ripple.

In the above circumstances, it had been required to develop a novel switching regulator free from the above problem.

SUMMARY OF THE INVENTION

Accordingly, it is an object of the present invention to provide a novel switching regulator free from the above problems.

It is a further object of the present invention to provide a novel switching regulator capable of outputting an output voltage with a reduced ripple as the pulse width modulation system.

It is a still further object of the present invention to provide a novel switching regulator exhibiting an increased voltage transformation efficiency as the pulse'frequency modulation system.

The first present invention provides a switching regulator a switching circuit for switching a transmission of an input voltage to an output terminal; a control circuit connected to the switching device for sending a control pulse signal to the switching circuit, so that the switching circuit switches the transmission of the input voltage on the basis of the control pulse signal; and a pulse width varying circuit connected to the control circuit for varying a pulse width of the control pulse signal from the control circuit.

The second present invention provides a switching regulator: a switching circuit for switching a transmission of an input voltage to an output terminal ; a control circuit connected to the switching device for sending a control pulse signal to the switching circuit, so that the switching circuit switches the transmission of the input voltage on the basis of the control pulse signal, wherein the control circuit has a comparator having a first input terminal receiving a reference voltage and a second input terminal receiving a comparative voltage for comparison of the reference voltage and the comparative voltage; a pulse width varying circuit connected to the control circuit for varying a pulse width of the control pulse signal from the control circuit, wherein the pulse width varying circuit comprises a ripple supplying circuit connected to one of the first and second input terminals of the comparator for supplying a ripple to the control circuit in order to vary the pulse width of the control pulse signal from the control circuit, and the ripple supplying circuit has a RC-circuit configuration for generating RC-charge/discharge operations which generate the ripple; and a smoothing circuit connected between the switching circuit and the output terminal for smoothing an output from the switching circuit to send a smoothed output to the output terminal.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
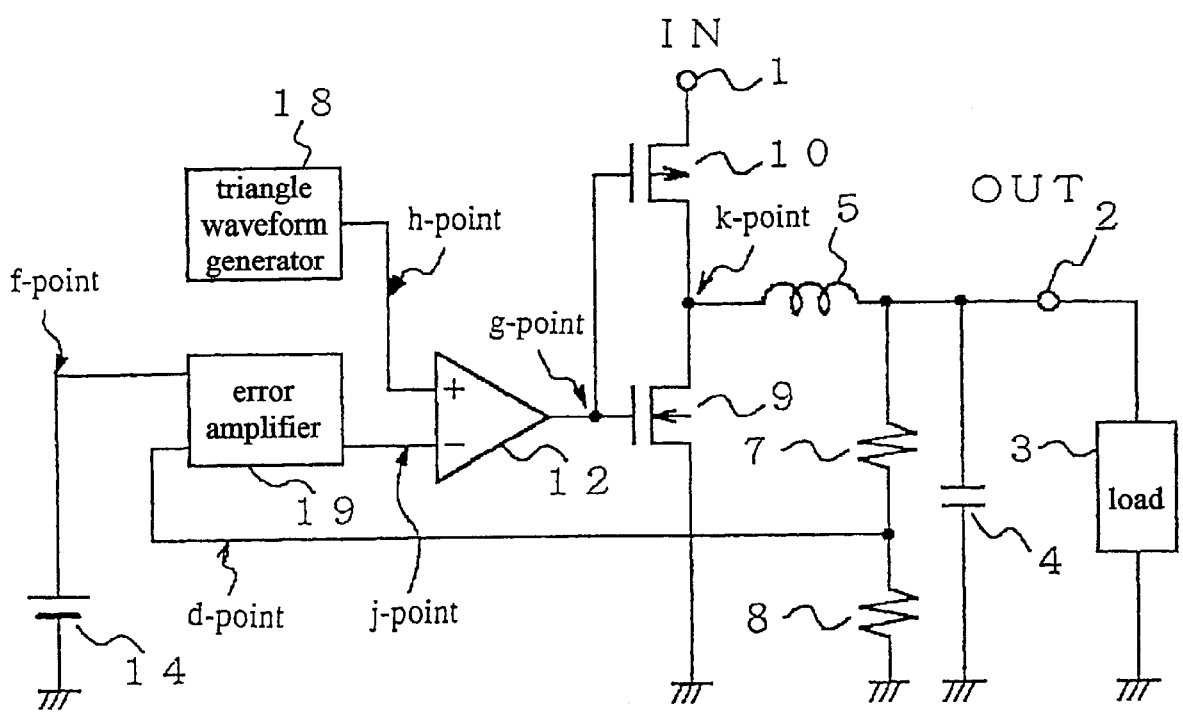
FIG. 1 is a circuit diagram illustrative of a first conventional switching regulator.
Figure 2:
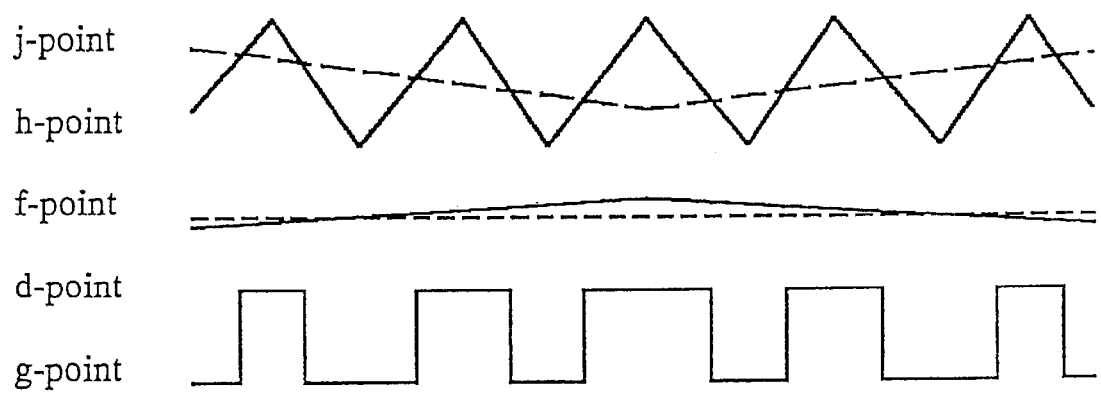
FIG. 2 is a diagram illustrative of waveforms of j-point potential, f-point potential, d-point potential and g-point output of the first conventional switching regulator of FIG. 1.
Figure 3:
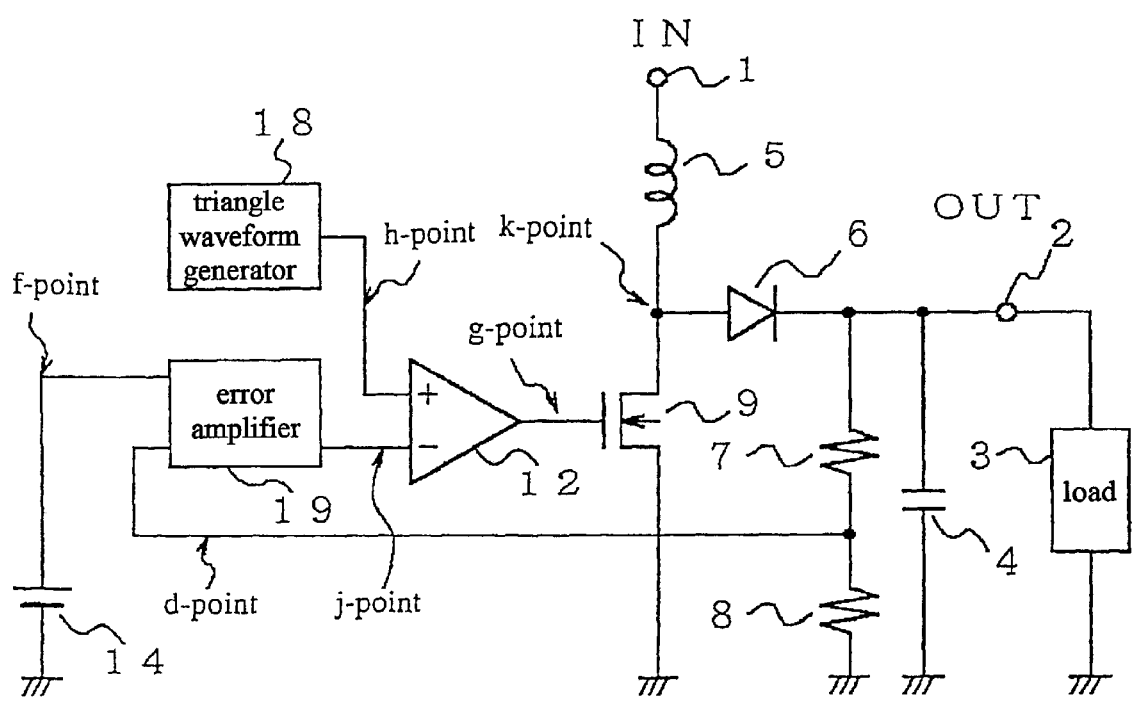
FIG. 3 is a circuit diagram illustrative of a second conventional switching regulator.
Figure 4:
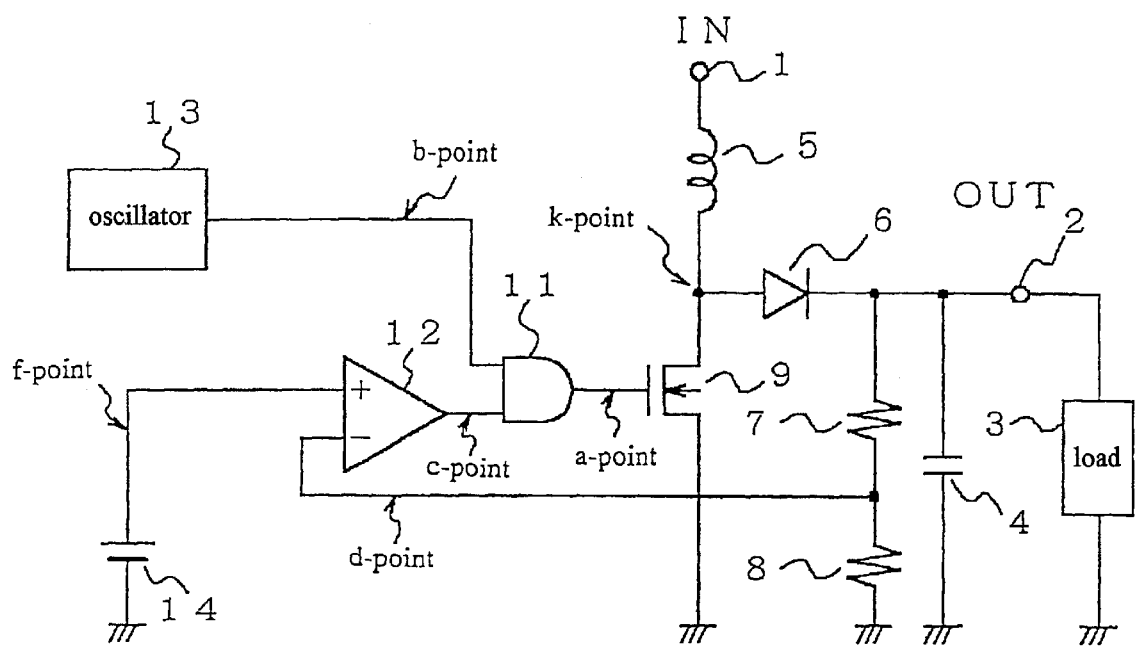
FIG. 4 is a circuit diagram illustrative of a third conventional switching regulator.

The first present invention provides a switching regulator : a switching circuit for switching a transmission of an input voltage to an output terminal; a control circuit connected to the switching device for sending a control pulse signal to the switching circuit, so that the switching circuit switches the transmission of the input voltage on the basis of the control pulse signal; and a pulse width varying circuit connected to the control circuit for varying a pulse width of the control pulse signal from the control circuit.

It is preferable that the control circuit has a comparator having a first input terminal receiving a reference voltage and a second input terminal receiving a comparative voltage for comparison of the reference voltage and the comparative voltage.

It is further preferable that the pulse width varying circuit comprises a ripple supplying circuit connected to one of the first and second input terminals of the comparator for supplying a ripple to the control circuit in order to vary the pulse width of the control pulse signal from the control circuit It is further more preferable that the ripple supplying circuit comprises a RC-circuit configuration for generating RC-charge/discharge operations which generate the ripple.

It is moreover preferable that the control circuit has a pulse oscillator connected to the ripple supplying circuit for sending clock pulses through the ripple supplying circuit to the one of the first and second input terminals of the comparator.

It is still more preferable that the ripple supplying circuit is connected between the one of the first and second input terminals of the comparator and a reference voltage supplying circuit for supplying the reference voltage, so that the reference voltage is supplied through the ripple circuit to the comparator.

It is yet more preferable that the ripple supplying circuit comprises: a series connection of first and second capacitors between the pulse oscillator and a ground line, so that an intermediate point of the first and second capacitors is connected to the one of the first and second input terminals of the comparator ; and a resistance connected between the reference voltage supplying circuit and the an intermediate point of the first and second capacitors.

It is also preferable that the ripple supplying circuit is connected between the one of the first and second input terminals of the comparator and an output point of a voltage dividing circuit connected to the output terminal, so that an output signal appearing at the output terminal is fed back through the ripple supplying circuit to the comparator.

It is further preferable that the ripple supplying circuit comprises: a series connection of first and second capacitors between the pulse oscillator and a ground line, so that an intermediate point of the first and second capacitors is connected to the one of the first and second input terminals of the comparator; and a resistance connected between the output point of the dividing circuit and the intermediate point of the first and second capacitors.

It is also preferable that the ripple supplying circuit with the RC-circuit configuration has a time-constant which is in the range of 0.1 time to 3 times of a reciprocal of a frequency of the clock pulses from the pulse oscillator.

It is also preferable that the control circuit has: a pulse oscillator for generating clock pulses; and a logic gate having a first input terminal connected to the pulse oscillator and a second input terminal connected to an output of the comparator and a single output terminal connected to the switching circuit for sending the control pulse signal to the switching circuit and also connected through the ripple supplying circuit to the one of the first and second input terminals of the comparator.

It is preferable that the ripple supplying circuit comprises : a series connection of first and second capacitors between the output terminal of the logic gate and a ground line, so that an intermediate point of the first and second capacitors is connected to the one of the first and second input terminals of the comparator ; and a resistance connected between a reference voltage supplying circuit for supplying the reference voltage and the intermediate point of the first and second capacitors.

It is preferable that the logic gate comprises an AND-gate.

It is preferable that the ripple supplying circuit with the RC-circuit configuration has a time-constant which is in the range of 0.1 time to 3 times of a reciprocal of a frequency of the clock pulses from the pulse oscillator.

It is preferable further comprising: a smoothing circuit connected between the switching circuit and the output terminal for smoothing an output from the switching circuit to send a smoothed output to the output terminal.

The second present invention provides a switching regulator: a switching circuit for switching a transmission of an input voltage to an output terminal; a control circuit connected to the switching device for sending a control pulse signal to the switching circuit, so that the switching circuit switches the transmission of the input voltage on the basis of the control pulse signal, wherein the control circuit has a comparator having a first input terminal receiving a reference voltage and a second input terminal receiving a comparative voltage for comparison of the reference voltage and the comparative voltage ; a pulse width varying circuit connected to the control circuit for varying a pulse width of the control pulse signal from the control circuit, wherein the pulse width varying circuit comprises a ripple supplying circuit connected to one of the first and second input terminals of the comparator for supplying a ripple to the control circuit in order to vary the pulse width of the control pulse signal from the control circuit, and the ripple supplying circuit has a RC-circuit configuration for generating RC-charge/discharge operations which generate the ripple ; and a smoothing circuit connected between the switching circuit and the output terminal for smoothing an output from the switching circuit to send a smoothed output to the output terminal.

It is preferable that the control circuit has a pulse oscillator connected to the ripple supplying circuit for sending clock pulses through the ripple supplying circuit to the one of the first and second input terminals of the comparator.

It is further preferable that the ripple supplying circuit is connected between the one of the first and second input terminals of the comparator and a reference voltage supplying circuit for supplying the reference voltage, so that the reference voltage is supplied through the ripple circuit to the comparator.

It is further more preferable that the ripple supplying circuit comprises: a series connection of first and second capacitors between the pulse oscillator and a ground line, so that an intermediate point of the first and second capacitors is connected to the one of the first and second input terminals of the comparator ; and a resistance connected between the reference voltage supplying circuit and the an intermediate point of the first and second capacitors.

It is also preferable that the ripple supplying circuit is connected between the one of the first and second input terminals of the comparator and an output point of a voltage dividing circuit connected to the output terminal, so that an output signal appearing at the output terminal is fed back through the ripple supplying circuit to the comparator.

It is still more preferable that the ripple supplying circuit comprises: a series connection of first and second capacitors between the pulse oscillator and a ground line, so that an intermediate point of the first and second capacitors is connected to the one of the first and second input terminals of the comparator; and a resistance connected between the output point of the dividing circuit and the intermediate point of the first and second capacitors.

It is also preferable that the ripple supplying circuit with the RC-circuit configuration has a time-constant which is in the range of 0.1 time to 3 times of a reciprocal of a frequency of the clock pulses from the pulse oscillator.

It is also preferable that the control circuit has: a pulse oscillator for generating clock pulses; and a logic gate having a first input terminal connected to the pulse oscillator and a second input terminal connected to an output of the comparator and a single output terminal connected to the switching circuit for sending the control pulse signal to the switching circuit and also connected through the ripple supplying circuit to the one of the first and second input terminals of the comparator.

It is preferable that the ripple supplying circuit comprises a series connection of first and second capacitors between the output terminal of the logic gate and a ground line, so that an intermediate point of the first and second capacitors is connected to the one of the first and second input terminals of the comparator; and a resistance connected between a reference voltage supplying circuit for supplying the reference voltage and the intermediate point of the first and second capacitors.

It is preferable that the logic gate comprises an AND-gate.

It is also preferable that the ripple supplying circuit with the RC-circuit configuration has a time-constant which is in the range of 0.1 time to 3 times of a reciprocal of a frequency of the clock pulses from the pulse oscillator.

PREFERRED EMBODIMENT

First Embodiment

Figure 5:
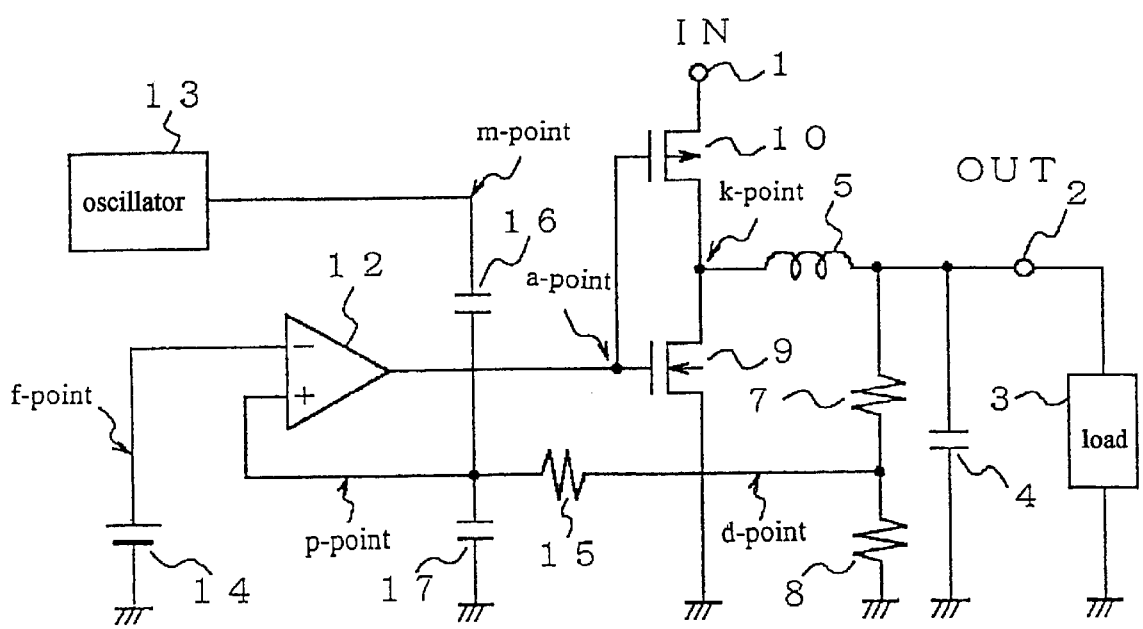
FIG. 5 is a circuit diagram illustrative of a first novel switching regulator in a first embodiment according to the present invention.
Figure 6:
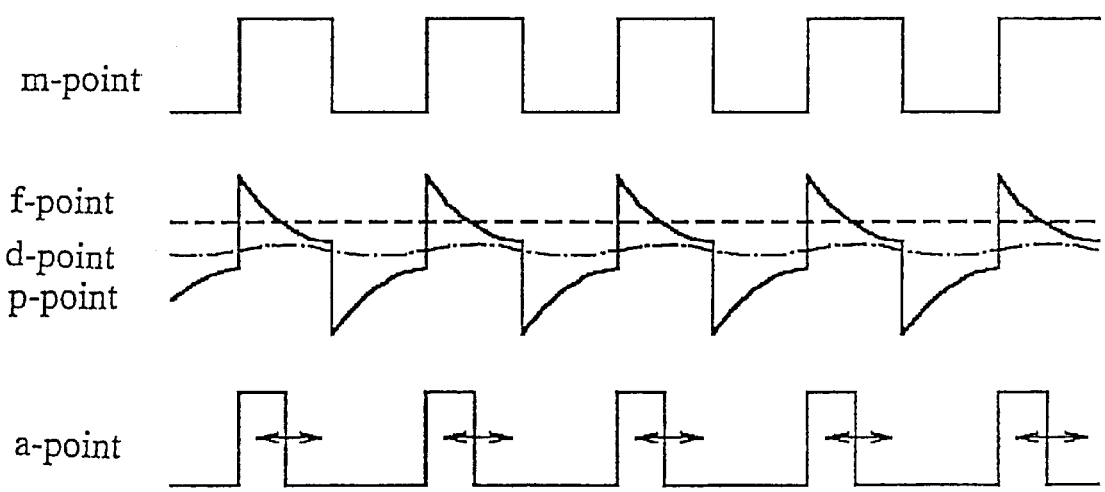
FIG. 6 is a diagram illustrative of waveforms of a clock signal, f-point potential, d-point potential, p-point potential and a-point output of the first novel switching regulator of FIG. 5.

A first embodiment according to the present invention will be described in detail with reference to the drawings. FIG. 5 is a circuit diagram illustrative of a first novel switching regulator in a first embodiment according to the present invention. FIG. 6 is a diagram illustrative of waveforms of a clock signal, f-point potential, d-point potential, p-point potential and a-point output of the first novel switching regulator of FIG. 5. The first novel switching regulator has a circuit configuration similar to that of the pulse frequency modulation system wherein no triangle waveform generator nor error-amplifier is provided, in place, a normal oscillator and a ripple supplying circuit are provided for varying a pulse width as in the pulse width modulation system, whereby the first novel switching regulator has a high voltage transformation efficiency and is capable of outputting an output voltage with a reduced ripple.

Namely, the first novel switching regulator has the following circuit elements. A power source 14 is provided for supplying a reference voltage to the first novel switching regulator. A comparator 12 is provided which has two inputs connected to an f-point which is connected to the power source 14 for receiving the reference voltage from the power source 14 and also connected to a p-point for receiving a comparative voltage, so that the comparator 12 compares the reference voltage from the power source 14 and the comparative voltage at the p-point to generate an output signal. An output of the comparator 12 is connected to an a-point. An oscillator 13 is also provided for generating a pulse waveform. The oscillator 13 is connected to an m-point. A ripple supplying circuit is also connected in series between the m-point and the ground line. The ripple supplying circuit is also connected through the p-point to the one input terminal of the comparator 12. The ripple supplying circuit comprises an RC-circuit which comprises a resistance 15 and a series connection of first and second capacitors 16 and 17. Namely, the first and second capacitors 16 and 17 are connected in series between the m-point and the ground line. A middle point of the first and second capacitors 16 and 17 is also connected through the p-point to the one input terminal of the comparator 12. The first capacitor 16 is connected through the m-point to the oscillator 13. The first capacitor 16 is thus connected between the m-point and the second capacitor 17. The second capacitor 17 is connected between the first capacitor 16 and the ground line. The middle point of the first and second capacitors 16 and 17 is not connected to the output terminal of the comparator 12. A series connection of a p-channel output switching transistor 10 and an n-channel output switching transistor 9 is provided between an input terminal IN1 and the ground line, wherein the p-channel output switching transistor 10 is connected in series between the input terminal IN1 and the n-channel output switching transistor 9, whilst the n-channel output switching transistor 9 is connected in series between the ground line and the p-channel output switching transistor 10. Gates of the p-channel output switching transistor 10 and the n-channel output switching transistor 9 are connected through the a-point to the output terminal of the comparator 12. A k-point is a middle point between the p-channel output switching transistor 10 and the n-channel output switching transistor 9. A coil 5 is connected in series between the k-point and an output terminal OUT2. A load 3 is further provided which is connected between the output terminal OUT2 and the ground line, so that the load 3 is connected in series through the output terminal OUT2 to the coil 5. A capacitor 4 is also provided which is connected between the output terminal OUT2 and the ground line, so that the capacitor 4 is connected in series through the coil 5 to the k-point and also connected in series through the output terminal OUT2 to the load 3. A series connection of first and second resistances 7 and 8 is also connected between the ground line and a middle point between the coil 5 and the output terminal OUT2, so that the series connection of first and second resistances 7 and 8 is connected through the output terminal OUT2 to the load 3 and also connected through the coil 5 to the k-point. An intermediate point between the first and second resistances 7 and 8 is also connected to a d-point. The resistance 15 of the RC circuit serving as the ripple supplying circuit is connected in series between the p-point and the d-point. The resistance 15 is connected through the d-point to the middle point between the first and second resistances 7 and 8. The resistance 15 is also connected through the p-point to the one input terminal of the comparator 12. Namely, the middle point between the first and second resistances 7 and 8 is connected through the resistance 15 to the one input terminal of the comparator 12, so that the middle point between the first and second resistances 7 and 8 supplies a comparative voltage through the resistance 15 to the comparator 12. The first resistance 7 is connected between the second resistance 8 and the intermediate point between the coil 5 and the output terminal OUT2, whilst the second resistance 8 is connected between the ground line and the first resistance 7.

The reference voltage supplied through the f-point from the power source 14 and the comparative voltage supplied through the p-point from the intermediate point between the first and second resistances 7 and 8 are compared by the comparator 12 to obtain an output, wherein the ripple circuit is connected to the one input terminal of the comparator 12 for supplying the ripple to the comparative voltage which is then inputted into the one input terminal of the comparator 12. The resistance 15 is also connected to the middle point of the first and second capacitors 16 and 17 of the ripple supplying circuit, so that the ripple supplying circuit shows RC charge/discharge operations for superimposing the ripple over the comparative voltage which is then inputted into the one input terminal of the comparator 12, whereby ON-OFF operations of the p-channel and nchannel switching transistors 10 and 9 are made in accordance with a result of the output from the comparator 12. The k-point as the middle point between the p-channel and n-channel switching transistors 10 and 9 is connected through the coil 5 and the capacitor 4 as a smoothing capacitor 4 to the output terminal OUT2 which is further connected through the load 3 to the ground line.

The input terminal IN1 is connected to an external power source not illustrated. As described above, the p-channel and n-channel switching transistors 10 and 9 are connected in series between the input terminal IN1 and the ground line. Drains of the p-channel and n-channel switching transistors 10 and 9 are connected to each other through the k-point which is further connected to one side of the coil 5 which accumulates energy. The other side of the coil 5 is also connected to both the output terminal OUT2 and the something capacitor 4. The load 3 is connected between the output terminal OUT2 and the ground line. A voltage dividing circuit which comprises the series connection of the first and second resistances 7 and 8 is connected between the output terminal OUT2 and the ground line. The middle point of the first and second resistances 7 and 8 serves as the output point of the voltage dividing circuit. The output point of the voltage dividing circuit is connected through the resistance 15 to the one input terminal of the comparator 12. The output point of the voltage dividing circuit is also connected through the resistance 15 to the middle point between the first and second capacitors 16 and 17 of the ripple supplying circuit.

Normally, the switching regulators are divided into two types, for example, the booster type and the voltage-down type. The above novel switching regulator shown in FIG. 5 is of the latter type, for example, the voltage-down switching regulator. The reference voltage supplied through the f-point from the power source 14 and the comparative voltage supplied through the p-point from the intermediate point between the first and second resistances 7 and 8 are compared by the comparator 12 to obtain an output, wherein the ripple circuit is connected to the one input terminal of the comparator 12 for supplying the ripple to the comparative voltage which is then inputted into the one input terminal of the comparator 12. The resistance 15 is also connected to the middle point of the first and second capacitors 16 and 17 of the ripple supplying circuit, so that the ripple supplying circuit shows RC charge/discharge operations for superimposing the ripple over the comparative voltage which is then inputted into the one input terminal of the comparator 12, whereby ON-OFF operations of the p-channel and n-channel switching transistors 10 and 9 are made in accordance with a result of the output from the comparator 12 to control transmission of the input voltage inputted into the input terminal IN1. The input voltage is then supplied to the coil 5 for accumulating the energy. The accumulated energy is then smoothed by the smoothing capacitor 4, so that a stable direct current output voltage appears at the output terminal OUT2.

Operations of the first novel switching regulator shown in FIG. 5 will subsequently be described with reference to FIG. 6. As described above, the first novel switching regulator is of the voltage-down type switching regulator, for which reason an expected output voltage V1, which is expected to appear at the output terminal OUT2, is lower in voltage level than the input voltage inputted into the input terminal IN1. If the actual output voltage Vout, which has actually appeared at the output terminal OUT2, is lower in voltage level than the expected output voltage V1, then the potential of the a-point is low level, whereby the p-channel switching transistor 10 turns ON, whilst the n-channel switching transistor 9 turns OFF. The input voltage is supplied through the p-channel switching transistor 10 to the coil 5, whereby the coil 5 increases the actual output voltage Vout appearing the output terminal OUT2, so that the actual output voltage Vout approaches the expected output voltage V1. If, however, the actual output voltage Vout, which has actually appeared at the output terminal OUT2, is higher in voltage level than the expected output voltage V1, then the potential of the a-point is high level, whereby the p-channel switching transistor 10 turns OFF, whilst the n-channel switching transistor 9 turns ON, whereby the coil 5 decreases the actual output voltage Vout appearing the output terminal OUT2, so that the actual output voltage Vout approaches the expected output voltage V1.

Subsequently, the operation of the first novel switching regulator will be described when the actual output voltage Vout is made equal to the expected output voltage V1. The oscillator 13 generates the pulse, for example, clocks which are supplied to the m-point. The clocks have an oscillation frequency of 100 kHz. A capacitive ratio of the first and second capacitors 16 and 17 is large. The first capacitor 16 has a capacitance of 0.2 pF. The second capacitor 17 has a capacitance of 10 pF. The capacitive ratio of the second capacitor 17 to the first capacitor 16 is 50. The capacitive ratio of the second capacitor 17 to the first capacitor 16 is so selected that a variation in potential level of the p-point upon a voltage variation of the clocks at the m-point is within a few mV to several tens mV A time constant of the RC-circuit comprising the resistances 7, 8 and 15 and the capacitors 16 and 17 is so set to be in the range of 0.1 time to a few times of a reciprocal number (1/f) of the oscillation frequency "f" of the oscillator 13.

The oscillation frequency "f" of the oscillator 13, the individual capacitances of the first and second capacitors 16 and 17 and the individual resistances of the resistances 7, 8 and 15 are so selected as described above, a waveform of the p-point shown in FIG. 6 is obtained, wherein the waveform of the p-point has an amplitude of about several tens mV, for example, 40 mV and charge/discharge curves shown in FIG. 6. The amplitude of the waveform of the p-point is such as to allow the comparator 12 to exhibit a sufficient response for enabling the output voltage from the comparator 12 or the voltage of the a-point to have rise-time and fall-time without any delay.

At this time, the actual output voltage Vout of the output terminal 2 is close to the expected output voltage V1. Since the reference voltage of the f-point and the comparative voltage of the p-point are close to each other, a relationship of the voltage levels of the reference voltage of the f-point and the comparative voltage of the p-point is made inverted, whereby the output from the comparator 12 is inverted. As can be seen from FIG. 6, since the comparative voltage of the p-point with the charge/discharge curves crosses the reference voltage of the f-point, the duty ratio of the output from the comparator 12 or the voltage of the a-point is modified to obtain substantially the same effect as can be obtained by the convention switching regulator using the triangle waveform shown in FIG. 1.

Consequently, the capacitive ratio of the second capacitor 17 to the first capacitor 16 is so selected that a variation in potential level of the p-point upon a voltage variation of the clocks at the m-point is within a few mV to several tens mV. Further, the time constant of the RC-circuit comprising the resistances 7, 8 and 15 and the capacitors 16 and 17 is so set to be in the range of 0.1 time to a few times of a reciprocal number (1/f) of the oscillation frequency "f" of the oscillator 13. Namely, the oscillation frequency "f" of the oscillator 13, the individual capacitances of the first and second capacitors 16 and 17 and the individual resistances of the resistances 7, 8 and 15 are so selected as described above, the waveform of the p-point shown in FIG. 6 is obtained, wherein the waveform of the p-point has an amplitude of about several tens mV, for example, 40 mV and charge/discharge curves shown in FIG. 6. Since the reference voltage of the f-point and the comparative voltage of the p-point are close to each other, a relationship of the voltage levels of the reference voltage of the f-point and the comparative voltage of the p-point is made inverted, whereby the output from the comparator 12 is inverted. As a result, ON-OFF operations of the p-channel and n-channel output switching transistors 10 and 9 are controlled by the inverted output from the comparator 12, whereby the input voltage is then supplied to the coil 5 for accumulating the energy. The accumulated energy is then smoothed by the smoothing capacitor 4, so that a stable direct current output voltage appears at the output terminal OUT2.

The waveform of the output from the comparator 12 or the voltage of the a-point is modified in duty ratio due to the fact that the comparative voltage of the p-point crosses the reference voltage of the f-point, thereby obtaining substantially the same effects as when the duty ratio is modified by use of the triangle waveform in the above described prior art.

The actual output voltage Vout at the output terminal OUT2 always approaches the expected output voltage V1. Further, the capacitances of the first and second capacitors 16 and 17 are so selected to have a preferable capacitive ratio for suppressing the variation in potential of the comparative voltage of the p-point into a small range, whereby the first novel switching regulator has almost the same circuit scale and power comsumption as the pulse frequency modulation system, whilst the first novel switching regulator is capable of outputting the output voltage with a reduced ripple of about 1 mV as small as the pulse width modulation system.

Contrary to the present invention, if the ripple supplying circuit is not provided which comprises the resistance 15 and the first and second capacitors 16 and 17 to input the voltage of the d-point directly to the one input terminal of the comparator 12, then the actual output voltage Vout appearing the output terminal OUT2 have a relatively large ripple. Accordingly, the ripple supplying circuit is essential for the first novel switching regulator.

Consequently, as described above, since the comparative voltage of the p-point as the feed-back point with the charge/discharge curves crosses the reference voltage of the f-point, the duty ratio of the output from the comparator 12 or the voltage of the a-point is modified to obtain substantially the same effect as can be obtained by the convention switching regulator using the triangle waveform shown in FIG. 1. Further, the actual output voltage Vout is made approach the expected output voltage V1, and the capacitive ratio of the second capacitor 17 to the first capacitor 16 is so selected that a variation in potential level of the p-point upon a voltage variation of the clocks at the m-point is within a few mV to several tens mV, whereby the first novel switch-ing regulator has almost the same circuit scale and power consumption as the pulse frequency modulation system, whilst the first novel switching regulator is capable of outputting the output voltage with a reduced ripple of about 1 mV as small as the pulse width modulation system.

Second Embodiment

Figure 7:
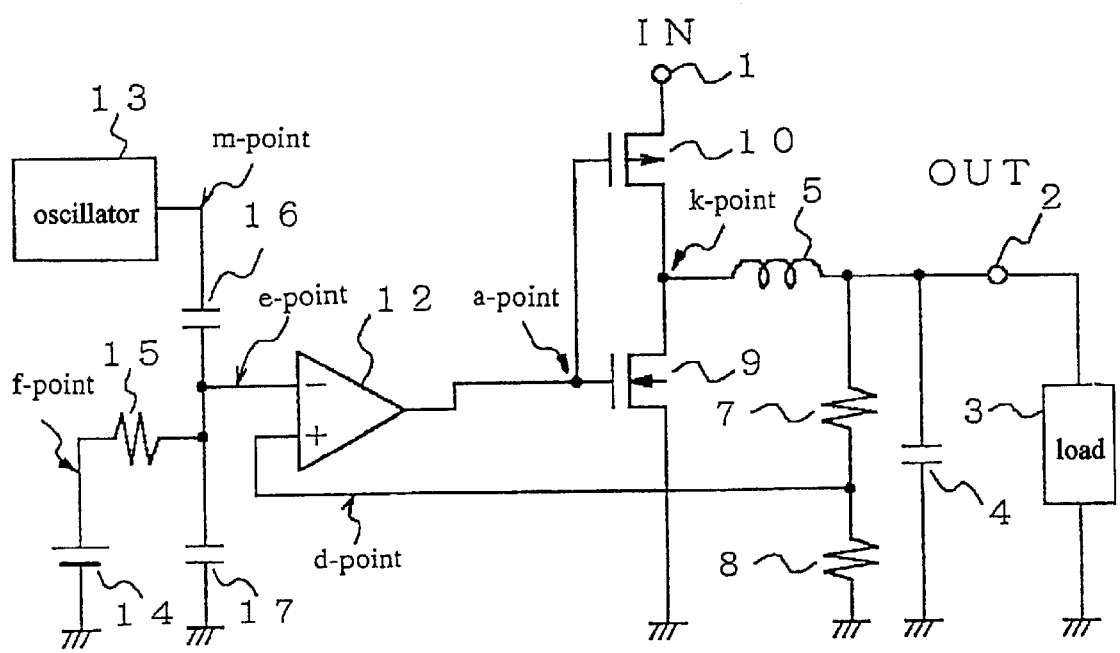
FIG. 7 is a circuit diagram illustrative of a second novel switching regulator in a second embodiment according to the present invention.

A second embodiment according to the present invention will be described in detail with reference to the drawings. FIG. 7 is a circuit diagram illustrative of a second novel switching regulator in a second embodiment according to the present invention. The second novel switching regulator has a circuit configuration similar to that of the pulse frequency modulation system wherein no triangle waveform generator nor error-amplifier is provided, in place, a normal oscillator and a ripple supplying circuit are provided for varying a pulse width as in the pulse width modulation system, whereby the second novel switching regulator has a high voltage transformation efficiency and is capable of outputting an output voltage with a reduced ripple.

Namely, the second novel switching regulator has the following circuit elements. A power source 14 is provided for supplying a reference voltage to the second novel switching regulator. An oscillator 13 is also provided for generating a pulse waveform. The oscillator 13 is connected to an m-point. A ripple supplying circuit is also connected in series between the m-point and the ground line. The ripple supplying circuit is also connected through an e-point to the one input terminal of the comparator 12. The ripple supplying circuit is also connected through the f-point to the power source 14. The ripple supplying circuit comprises an RC-circuit which comprises a resistance 15 and a series connection of first and second capacitors 16 and 17. Namely, the first and second capacitors 16 and 17 are connected in series between the m-point and the ground line. A middle point of the first and second capacitors 16 and 17 is also connected through the e-point to the one input terminal of the comparator 12. The first capacitor 16 is connected through the m-point to the oscillator 13. The first capacitor 16 is thus connected between the m-point and the second capacitor 17. The second capacitor 17 is connected between the first capacitor 16 and the ground line. The resistance 15 is connected between the e-point and the f-point. The ripple supplying circuit is connected between the power source 14 and one input terminal of a comparator 12, so that the reference voltage from the power source 14 is supplied through the ripple supplying circuit to the one input terminal of the comparator 12. The comparator 12 is connected through the ripple supplying circuit to the power source 14 and also connected to a d-point for receiving a comparative voltage, so that the ripple supplying circuit provides a ripple to the reference voltage from the power source 14, whereby the comparator 12 compares the reference voltage with the ripple from the ripple supplying circuit and the comparative voltage at the d-point to generate an output signal. An output of the comparator 12 is connected to an a-point. A series connection of a p-channel output switching transistor 10 and an n-channel output switching transistor 9 is provided between an input terminal INI and the ground line, wherein the p-channel output switching transistor 10 is connected in series between the input terminal IN1 and the n-channel output switching transistor 9, whilst the n-channel output switching transistor 9 is connected in series between the ground line and the p-channel output switching transistor 10. Gates of the p-channel output switching transistor 10 and the n-channel output switching transistor 9 are connected through the. a-point to the output terminal of the comparator 12. A k-point is a middle point between the p-channel output switching transistor 10 and the n-channel output switching transistor 9. A coil 5 is connected in series between the k-point and an output terminal OUT2. A load 3 is further provided which is connected between the output terminal OUT2 and the ground line, so that the load 3 is connected in series through the output terminal OUT2 to the coil 5. A capacitor 4 is also provided which is connected between the output terminal OUT2 and the ground line, so that the capacitor 4 is connected in series through the coil 5 to the k-point and also connected in series through the output terminal OUT2 to the load 3. A series connection of first and second resistances 7 and 8 is also connected between the ground line and a middle point between the coil 5 and the output terminal OUT2, so that the series connection of first and second resistances 7 and 8 is connected through the output terminal OUT2 to the load 3 and also connected through the coil 5 to the k-point. An intermediate point between the first and second resistances 7 and 8 is also connected to the d-point. Namely, the intermediate point between the first and second resistances 7 and 8 is connected through the d-point to the other input terminal of the comparator 12 for supplying the comparative voltage to the comparator 12. The first resistance 7 is connected between the second resistance 8 and the intermediate point between the coil 5 and the output terminal OUT2, whilst the second resistance 8 is connected between the ground line and the first resistance 7.

The reference voltage with the ripple supplied through the ripple supplying circuit from the power source 14 and the comparative voltage supplied through the d-point from the intermediate point between the first and second resistances 7 and 8 are compared by the comparator 12 to obtain an output, wherein the ripple circuit is connected to the one input terminal of the comparator 12 for supplying the ripple to the reference voltage which is then inputted into the one input terminal of the comparator 12. The resistance 15 is also connected to the power source 14, so that the ripple supplying circuit shows RC charge/discharge operations for superimposing the ripple over the reference voltage which is then inputted into the one input terminal of the comparator 12, whereby ON-OFF operations of the p-channel and n-channel switching transistors 10 and 9 are made in accordance with a result of the output from the comparator 12. The k-point as the middle point between the p-channel and n-channel switching transistors 10 and 9 is connected through the coil 5 and the capacitor 4 as a smoothing capacitor 4 to the output terminal OUT2 which is further connected through the load 3 to the ground line.

The input terminal IN1 is connected to an external power source not illustrated. As described above, the p-channel and n-channel switching transistors 10 and 9 are connected in series between the input terminal IN1 and the ground line. Drains of the p-channel and n-channel switching transistors 10 and 9 are connected to each other through the k-point which is further connected to one side of the coil 5 which accumulates energy. The other side of the coil 5 is also connected to both the output terminal OUT2 and the something capacitor 4. The load 3 is connected between the output terminal OUT2 and the ground line. A voltage dividing circuit which comprises the series connection of the first and second resistances 7 and 8 is connected between the output terminal OUT2 and the ground line. The middle point of the first and second resistances 7 and 8 serves as the output point of the voltage dividing circuit. The output point of the voltage dividing circuit is connected through the d-point to the one input terminal of the comparator 12.

Normally, the switching regulators are divided into two types, for example, the booster type and the voltage-down type. The above novel switching regulator shown in FIG. 7 is of the latter type, for example, the voltage-down switching regulator. The reference voltage supplied through the ripple supplying circuit from the power source 14 and the comparative voltage supplied through the d-point from the intermediate point between the first and second resistances 7 and 8 of the voltage dividing circuit are compared by the comparator 12 to obtain an output, wherein the ripple circuit is connected to the one input terminal of the comparator 12 for supplying the ripple to the reference voltage which is then inputted into the one input terminal of the comparator 12. The resistance 15 is also connected to the middle point of the first and second capacitors 16 and 17 of the ripple supplying circuit, so that the ripple supplying circuit shows RC charge/discharge operations for superimposing the ripple over the reference voltage which is then inputted into the one input terminal of the comparator 12, whereby ON-OFF operations of the p-channel and n-channel switching transistors 10 and 9 are made in accordance with a result of the output from the comparator 12 to control transmission of the input voltage inputted into the input terminal IN1. The input voltage is then supplied to the coil 5 for accumulating the energy. The accumulated energy is then smoothed by the smoothing capacitor 4, so that a stable direct current output voltage appears at the output terminal OUT2.

Operations of the second novel switching regulator shown in FIG. 7 is basically the same as of the first novel switching regulator described above in the first embodiment. As described above, the second novel switching regulator is of the voltage-down type switching regulator, for which reason an expected output voltage V1, which is expected to appear at the output terminal OUT2, is lower in voltage level than the input voltage inputted into the input terminal IN1. If the actual output voltage Vout, which has actually appeared at the output terminal OUT2, is lower in voltage level than the expected output voltage V1, then the potential of the a-point is low level, whereby the p-channel switching transistor 10 turns ON, whilst the n-channel switching transistor 9 turns OFF. The input voltage is supplied through the p-channel switching transistor 10 to the coil 5, whereby the coil 5 increases the actual output voltage Vout appearing the output terminal OUT2, so that the actual output voltage Vout approaches the expected output voltage V1. If, however, the actual output voltage Vout, which has actually appeared at the output terminal OUT2, is higher in voltage level than the expected output voltage V1, then the potential of the a-point is high level, whereby the p-channel switching transistor 10 turns OFF, whilst the n-channel switching transistor 9 turns ON, whereby the coil 5 decreases the actual output voltage Vout appearing the output terminal OUT2, so that the actual output voltage Vout approaches the expected output voltage V1.

Subsequently, the operation of the second novel switching regulator will be described when the actual output voltage Vout is made equal to the expected output voltage V1. The oscillator 13 generates the pulse, for example, clocks which are supplied to the m-point. The clocks have a predetermined oscillation frequency. A capacitive ratio of the first and second capacitors 16 and 17 is large. The capacitive ratio of the second capacitor 17 to the first capacitor 16 is so selected that a variation in potential level of the e-point upon a voltage variation of the clocks at the m-point is within a predetermined small range.

The oscillation frequency "f" of the oscillator 13, the individual capacitances of the first and second capacitors 16 and 17 and the resistance of the resistance 15 are so selected as described above, a waveform of the e-point has such an amplitude as to allow the comparator 12 to exhibit a sufficient response for enabling the output voltage from the comparator 12 or the voltage of the a-point to have rise-time and fall-time without any delay.

At this time, the actual output voltage Vout of the output terminal 2 is close to the expected output voltage V1. Since the reference voltage with the ripple of the e-point and the comparative voltage of the d-point are close to each other, a relationship of the voltage levels of the reference voltage of the e-point and the comparative voltage of the d-point is made inverted, whereby the output from the comparator 12 is inverted. Since the reference voltage of the e-point with the charge/discharge curves crosses the comparative voltage of the d-point, the duty ratio of the output from the comparator 12 or the voltage of the a-point is modified to obtain substantially the same effect as can be obtained by the convention switching regulator using the triangle waveform shown in FIG. 1.

Consequently, the capacitive ratio of the second capacitor 17 to the first capacitor 16 is so selected that a variation in potential level of the e-point upon a voltage variation of the clocks at the m-point is within the predetermined range. Since the reference voltage of the e-point and the comparative voltage of the d-point are close to each other, a relationship of the voltage levels of the reference voltage of the e-point and the comparative voltage of the d-point is made inverted, whereby the output from the comparator 12 is inverted. As a result, ON-OFF operations of the p-channel and n-channel output switching transistors 10 and 9 are controlled by the inverted output from the comparator 12, whereby the input voltage is then supplied to the coil 5 for accumulating the energy. The accumulated energy is then smoothed by the smoothing capacitor 4, so that a stable direct current output voltage appears at the output terminal OUT2.

The waveform of the output from the comparator 12 or the voltage of the a-point is modified in duty ratio due to the fact that the comparative voltage of the d-point crosses the reference voltage of the e-point point, thereby obtaining substantially the same effects as when the duty ratio is modified by use of the triangle waveform in the above described prior art.

The actual output voltage Vout at the output terminal OUT2 always approaches the expected output voltage V1. Further, the capacitances of the first and second capacitors 16 and 17 are so selected to have a preferable capacitive ratio for suppressing the variation in potential of the reference voltage of the e-point into a small range, whereby the second novel switching regulator has almost the same circuit scale and power comsumption as the pulse frequency modulation system, whilst the second novel switching regulator is capable of outputting the output voltage with a reduced ripple as small as the pulse width modulation system.

Contrary to the present invention, if the ripple supplying circuit is not provided which comprises the resistance 15 and the first and second capacitors 16 and 17 to input the voltage of the f-point directly to the one input terminal of the comparator 12, then the actual output voltage Vout appearing the output terminal OUT2 have a relatively large ripple. Accordingly, the ripple supplying circuit is essential for the second novel switching regulator.

Consequently, as described above, since the reference voltage of the e-point with the charge/discharge curves crosses the comparative voltage of the d-point, the duty ratio of the output from the comparator 12 or the voltage of the a-point is modified to obtain substantially the same effect as can be obtained by the convention switching regulator using the triangle waveform shown in FIG. 1. Further, the actual output voltage Vout is made approach the expected output voltage V1, and the capacitive ratio of the second capacitor 17 to the first capacitor 16 is so selected that a variation in potential level of the e-point upon a voltage variation of the clocks at the m-point is within the predetermined range, whereby the second novel switching regulator has almost the same circuit scale and power comsumption as the pulse frequency modulation system, whilst the second novel switching regulator is capable of outputting the output voltage with a reduced ripple as small as the pulse width modulation system.

Third Embodiment

Figure 8:
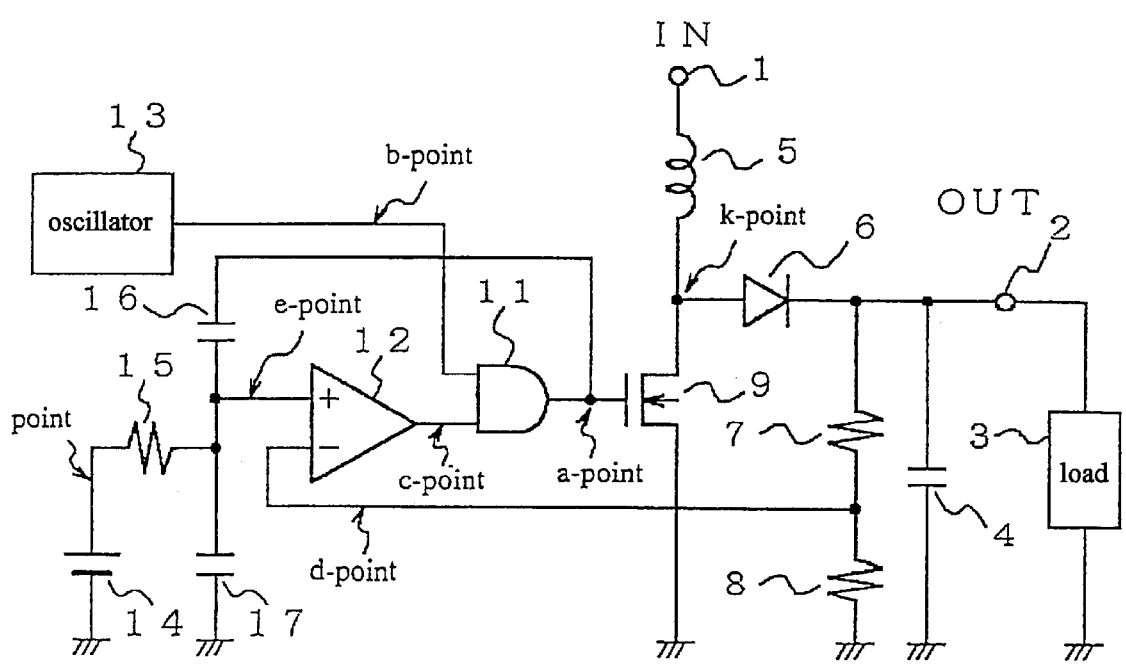
FIG. 8 is a circuit diagram illustrative of a second novel switching regulator in a second embodiment according to the present invention.
Figure 9:
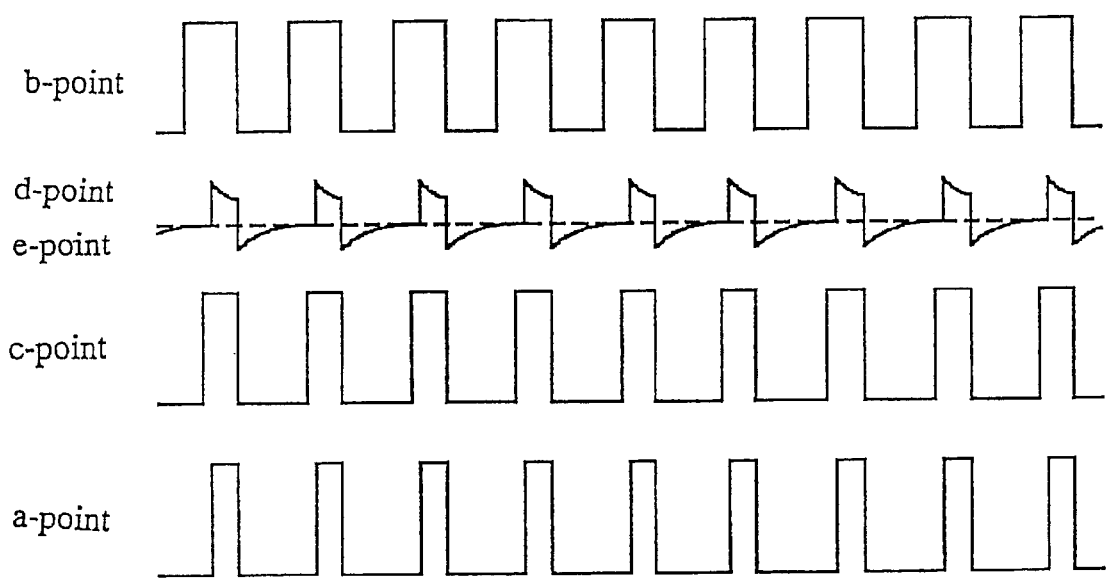
FIG. 9 is a diagram illustrative of waveforms of a clock signal, e-point potential, d-point potential, c-point potential and a-point output of the third novel switching regulator of FIG. 8.

A third embodiment according to the present invention will be described in detail with reference to the drawings. FIG. 8 is a circuit diagram illustrative of a second novel switching regulator in a second embodiment according to the present invention. FIG. 9 is a diagram illustrative of waveforms of a clock signal, e-point potential, d-point potential, c-point potential and a-point output of the third novel switching regulator of FIG. 8. The third novel switching regulator has a circuit configuration similar to that of the pulse frequency modulation system wherein no triangle waveform generator nor error-amplifier is provided, in place, a normal oscillator and a ripple supplying circuit are provided for varying a pulse width as in the pulse width modulation system, whereby the third novel switching regulator has a high voltage transformation efficiency and is capable of outputting an output voltage with a reduced ripple.

Namely, the third novel switching regulator has the following circuit elements. A power source 14 is provided for supplying a reference voltage to the third novel switching regulator. An oscillator 13 is also provided for generating a pulse waveform. The oscillator 13 is connected to a b-point. A ripple supplying circuit is also connected in series between an a-point and the ground line. The ripple supplying circuit is also connected through an e-point to the one input terminal of the comparator 12. The ripple supplying circuit is also connected through the f-point to the power source 14. The ripple supplying circuit comprises an RC-circuit which comprises a resistance 15 and a series connection of first and second capacitors 16 and 17. Namely, the first and second capacitors 16 and 17 are connected in series between the a-point and the ground line. A middle point of the first and second capacitors 16 and 17 is also connected through the e-point to the one input terminal of the comparator 12. The first capacitor 16 is connected to the a-point. The first capacitor 16 is thus connected between the a-point and the second capacitor 17. The second capacitor 17 is connected between the first capacitor 16 and the ground line. The resistance 15 is connected between the e-point and the f-point. The ripple supplying circuit is connected between the power source 14 and one input terminal of the comparator 12, so that the reference voltage from the power source 14 is supplied through the ripple supplying circuit to the one input terminal of the comparator 12. The comparator 12 is connected through the ripple supplying circuit to the power source 14 and also connected to a d-point for receiving a comparative voltage, so that the ripple supplying circuit provides a ripple to the reference voltage from the power source 14, whereby the comparator 12 compares the reference voltage with the ripple from the ripple supplying circuit and the comparative voltage at the d-point to generate an output signal. An output of the comparator 12 is connected to a c-point. A logic gate, for example, an AND-gate 11 is provided which has two inputs and one output. One input of the AND-gate 11 is connected through the c-point to the output terminal of the comparator 12 for receiving the output from the comparator 12. Other input of the AND-gate 11 is also connected through the b-point to the oscillator 13 for receiving the clocks from the oscillator 13. The output terminal of the AND-gate is connected through the a-point to the first capacitor 16 of the ripple supplying circuit. Namely, the output from the AND-gate 11 is fed back through the ripple supplying circuit to the other input of the comparator 12. A series connection of a coil 5 and an n-channel output switching transistor 9 is provided between an input terminal INI and the ground line, wherein the coil 5 is connected in series between the input terminal IN1 and the n-channel output switching transistor 9, whilst the n-channel output switching transistor 9 is connected in series between the ground line and the coil 5. A gate of the n-channel output switching transistor 9 is connected through the a-point to the output terminal of the AND-gate 11. A k-point is a middle point between the coil 5 and the n-channel output switching transistor 9. A diode 6 is connected in series between the k-point and an output terminal OUT2. A load 3 is further provided which is connected between the output terminal OUT2 and the ground line, so that the load 3 is connected in series through the output terminal OUT2 to the diode 6. A capacitor 4 is also provided which is connected between the output terminal OUT2 and the ground line, so that the capacitor 4 is connected in series through the diode 6 to the k-point and also connected in series through the output terminal OUT2 to the load 3. A series connection of first and second resistances 7 and 8 is also connected between the ground line and a middle point between the diode 6 and the output terminal OUT2, so that the series connection of first and second resistances 7 and 8 is connected through the output terminal OUT2 to the load 3 and also connected through the diode 6 to the k-point. An intermediate point between the first and second resistances 7 and 8 is also connected through the d-point. Namely, the intermediate point between the first and second resistances 7 and 8 is connected through the d-point to the other input terminal of the comparator 12 for supplying the comparative voltage to the comparator 12. The first resistance 7 is connected between the second resistance 8 and the intermediate point between the diode 6 and the output terminal OUT2, whilst the second resistance 8 is connected between the ground line and the first resistance 7.

The output from the AND-gate 11 or the voltage at the a-point is fed back through the ripple supplying circuit to the comparator 12. The ripple is given on the basis of the output from the AND-gate 11. The reference voltage with the ripple supplied from the power source 14 through the ripple supplying circuit and the comparative voltage supplied through the d-point from the intermediate point between the first and second resistances 7 and 8 are compared by the comparator 12 to obtain an output, wherein the ripple circuit is connected to the one input terminal of the comparator 12 for generating the ripple on the basis of the output from the AND-gate 11 and then supply the ripple to the reference voltage which is then inputted into the one input terminal of the comparator 12. The resistance 15 is also connected to the power source 14, so that the ripple supplying circuit shows RC charge/discharge operations for superimposing the ripple over the reference voltage which is then inputted into the one input terminal of the comparator 12, whereby ON-OFF operations of the n-channel switching transistor 9 are made in accordance with a result of the output from the AND-gate 11. The k-point as the middle point between the coil 5 and the n-channel switching transistor 9 is connected through the diode 6 and the capacitor 4 as a smoothing capacitor 4 to the output terminal OUT2 which is further connected through the load 3 to the ground line.

The input terminal IN1 is connected to an external power source not illustrated. As described above, the coil 5 and the n-channel switching transistor 9 are connected in series between the input terminal IN1 and the ground line. A drain of the n-channel switching transistor 9 is connected to through the k-point to one side of the diode 6 which accumulates energy. The other side of the diode 6 is also connected to both the output terminal OUT2 and the something capacitor 4. The load 3 is connected between the output terminal OUT2 and the ground line. A voltage dividing circuit which comprises the series connection of the first and second resistances 7 and 8 is connected between the output terminal OUT2 and the ground line. The middle point of the first and second resistances 7 and 8 serves as the output point of the voltage dividing circuit. The output point of the voltage dividing circuit is connected through the d-point to the one input terminal of the comparator 12.

Normally, the switching regulators are divided into two types, for example, the booster type and the voltage-down type. The above novel switching regulator shown in FIG. 8 is of the former type, for example, the booster type switching regulator. The reference voltage supplied through the ripple supplying circuit from the power source 14 and the comparative voltage supplied through the d-point from the intermediate point between the first and second resistances 7 and 8 of the voltage dividing circuit are compared by the comparator 12 to obtain an output, wherein the ripple circuit is connected to the one input terminal of the comparator 12 for supplying the ripple to the reference voltage which is then inputted into the one input terminal of the comparator 12. The resistance 15 is also connected to the middle point of the first and second capacitors 16 and 17 of the ripple supplying circuit, so that the ripple supplying circuit shows RC charge/discharge operations for superimposing the ripple over the reference voltage which is then inputted into the one input terminal of the comparator 12. Further, the AND-gate 11 receives the clocks from the oscillator 13 and the output from the comparator 12, whereby ON-OFF operations of the n-channel switching transistor 9 are made in accordance with a result of the output from the AND-gate 11 to control transmission of the input voltage inputted into the input terminal IN1. The input voltage is then supplied to the diode 6 for accumulating the energy. The accumulated energy is then smoothed by the smoothing capacitor 4, so that a stable direct current output voltage appears at the output terminal OUT2.

Operations of the third novel switching regulator shown in FIG. 8 is will be described. As described above, the third novel switching regulator is of the booster type switching regulator, for which reason an expected output voltage VI, which is expected to appear at the output terminal OUT2, is lower in voltage level than the input voltage inputted into the input terminal IN1. If the actual output voltage Vout, which has actually appeared at the output terminal OUT2, is lower in voltage level than the expected output voltage V1, then the potential of the a-point is low level, whereby the n-channel switching transistor 9 turns OFF. The input voltage is supplied through the coil 5 to the diode 6, whereby the diode 6 increases the actual output voltage Vout appearing the output terminal OUT2, so that the actual output voltage Vout approaches the expected output voltage V1. If, however, the actual output voltage Vout, which has actually appeared at the output terminal OUT2, is higher in voltage level than the expected output voltage V1, then the potential of the a-point is high level, whereby the n-channel switching transistor 9 turns ON, whereby the diode 6 prevents the voltage drop of the actual output voltage Vout appearing the output terminal OUT2.

Subsequently, the operation of the third novel switching regulator will be described when the actual output voltage Vout is made equal to the expected output voltage V1. The oscillator 13 generates the pulse, for example, clocks which are supplied to the b-point. The clocks have a predetermined oscillation frequency. A capacitive ratio of the first and second capacitors 16 and 17 is large. The capacitive ratio of the second capacitor 17 to the first capacitor 16 is so selected that a variation in potential level of the e-point upon a voltage variation of the voltage at the a-point or the output from the AND-gate 11 is within a predetermined small range.

The oscillation frequency "f" of the oscillator 13, the individual capacitances of the first and second capacitors 16 and 17 and the resistance of the resistance 15 are so selected as described above, a waveform of the e-point has such an amplitude as to allow the comparator 12 to exhibit a sufficient response for enabling the output voltage from the comparator 12 or the voltage of the c-point to have rise-time and fall-time without any delay.

At this time, the actual output voltage Vout of the output terminal 2 is close to the expected output voltage V1. Since the reference voltage with the ripple of the e-point and the comparative voltage of the d-point are close to each other, a relationship of the voltage levels of the reference voltage of the e-point and the comparative voltage of the d-point is made inverted, whereby the output from the comparator 12 is inverted and thus the output from the AND-gate 11 is also inverted. Since the reference voltage of the e-point with the charge/discharge curves crosses the comparative voltage of the d-point, the duty ratio of the output from the comparator 12 or the voltage of the c-point is modified to obtain substantially the same effect as can be obtained by the convention switching regulator using the triangle waveform shown in FIG. 1. Therefore, the duty ratio of the output from the AND-gate 11 or the voltage of the a-point is also modified to obtain substantially the same effect as can be obtained by the convention switching regulator using the triangle waveform shown in FIG. 1.

Consequently, the capacitive ratio of the second capacitor 17 to the first capacitor 16 is so selected that a variation in potential level of the e-point upon a voltage variation of the clocks at the m-point is within the predetermined range. Since the reference voltage of the e-point and the comparative voltage of the d-point are close to each other, a relationship of the voltage levels of the reference voltage of the e-point and the comparative voltage of the d-point is made inverted, whereby the output from the comparator 12 is inverted. As a result, ON-OFF operations of the n-channel output switching transistor 9 are controlled by the inverted output from the AND-gate 11, whereby the input voltage is then supplied through the coil 5 to the diode 6 for accumulating the energy. The accumulated energy is then smoothed by the smoothing capacitor 4, so that a stable direct current output voltage appears at the output terminal OUT2.

The waveform of the output from the comparator 12 or the voltage of the c-point is modified in duty ratio due to the fact that the comparative voltage of the d-point crosses the reference voltage of the e-point. The waveform of the output from the AND-gate 11 or the voltage of the a-point is also modified in duty ratio due to the fact that the comparative voltage of the d-point crosses the reference voltage of the e-point, thereby obtaining substantially the same effects as when the duty ratio is modified by use of the triangle waveform in the above described prior art.

The actual output voltage Vout at the output terminal OUT2 always approaches the expected output voltage V1. Further, the capacitances of the first and second capacitors 16 and 17 are so selected to have a preferable capacitive ratio for suppressing the variation in potential of the reference voltage of the e-point into a small range, whereby the third novel switching regulator has almost the same circuit scale and power comsumption as the pulse frequency modulation system, whilst the third novel switching regulator is capable of outputting the output voltage with a reduced ripple as small as the pulse width modulation system.

Contrary to the present invention, if the ripple supplying circuit is not provided which comprises the resistance 15 and the first and second capacitors 16 and 17 to input the voltage of the f-point directly to the one input terminal of the comparator 12, then the actual output voltage Vout appearing the output terminal OUT2 have a relatively large ripple. Accordingly, the ripple supplying circuit is essential for the third novel switching regulator.

Consequently, as described above, since the reference voltage of the e-point with the charge/discharge curves crosses the comparative voltage of the d-point, the duty ratio of the output from the comparator 12 and the duty ratio of the output from the AND-gate 11 are modified to obtain substantially the same effect as can be obtained by the convention switching regulator using the triangle waveform shown in FIG. 1. Further, the actual output voltage Vout is made approach the expected output voltage V1, and the capacitive ratio of the second capacitor 17 to the first capacitor 16 is so selected that a variation in potential level of the e-point upon a voltage variation of the clocks at the b-point is within the predetermined range, whereby the third novel switching regulator has almost the same circuit scale and power comsumption as the pulse frequency modulation system, whilst the third novel switching regulator is capable of outputting the output voltage with a reduced ripple as small as the pulse width modulation system.

Where as modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A switching regulator comprising:

a switching circuit for switching a transmission of an input voltage to an output terminal;

a control circuit connected to said switching device for sending a control pulse signal to said switching circuit, so that said switching circuit switches said transmission of said input voltage on the basis of said control pulse signal, said control circuit comprising a comparator having a first input terminal receiving a reference voltage and a second input terminal receiving a comparative voltage for comparison of said reference voltage and said comparative voltage; and a pulse width varying circuit connected to said control circuit for varying a pulse width of said control pulse signal from said control circuit, said pulse width varying circuit comprising a ripple supplying circuit connected to one of said first and second input terminals of said comparator for supplying a ripple to said control circuit in order to vary said pulse width of said control pulse signal from said control circuit.

2. The switching regulator as claimed in claim 1, wherein said ripple supplying circuit comprises a RC-circuit configuration for generating RC-charge/discharge operations which generate said ripple.

3. The switching regulator as claimed in claim 2, wherein said control circuit has a pulse oscillator connected to said ripple supplying circuit for sending clock pulses through said ripple supplying circuit to said one of said first and second input terminals of said comparator.

4. The switching regulator as claimed in claim 3, wherein said ripple supplying circuit is connected between said one of said first and second input terminals of said comparator and a reference voltage supplying circuit for supplying said reference voltage, so that said reference voltage is supplied through said ripple circuit to said comparator.

5. The switching regulator as claimed in claim 4, wherein said ripple supplying circuit comprises:
   a series connection of first and second capacitors between said pulse oscillator and a ground line, so that an intermediate point of said first and second capacitors is connected to said one of said first and second
   a resistance connected between said reference voltage supplying circuit and said an intermediate point of said first and second capacitors.

6. The switching regular or as claimed in claim 3, wherein said ripple supplying circuit is connected between said one of said first and second input terminal of said comparator and an output point of a voltage dividing Circuit connected to said output terminal, so that an output signal appearing at said output terminal is fed back through said ripple supplying circuit to said comparator.

7. The switching regulator as claimed in claim 6, wherein said ripple supplying circuit comprises:
   a series connection f first and second capacitors between said pulse oscillator and a ground line, so that an intermediate point of said first and second capacitors is connected to said one of said first and second input terminals of said comparator; and
   a resistance connected between said output point of said dividing circuit and said intermediate point of said first and second capacitors.

8. The switching regulator as claimed in claim 3, wherein said ripple supplying circuit with said RC-circuit configuration has a time-constant which is in the range of 0.1 time to 3 times of a reciprocal of a frequency of said clock pulses from said pulse oscillator.

9. The switching regulator as claimed in claim 2, wherein said control circuit has:
   a pulse oscillator for generating clock pulses; and
   a logic gate having a first input terminal connected to said pulse oscillator and a second input terminal connected to an output of said comparator and a single output terminal connected to said switching circuit for sending said control pulse signal to said switching circuit and also connected through said ripple supplying circuit to said one of said first and second input terminals of said comparator.

10. The switching regulator as claimed in claim 9, wherein said ripple supplying circuit comprises:
    a series connection of first and second capacitors between said output terminal of said logic gate and a ground line, so that an intermediate point of said first and second capacitors is connected to said one of said first and second input terminals of said comparator; and
    a resistance connected between a reference voltage supplying circuit for supplying said reference voltage and said intermediate point of said first and second capacitors.

11. The switching regulator as claimed in claim 10, wherein said logic gate comprises an AND-gate.

12. The switching regulator as claimed in claim 9, wherein said ripple supplying circuit with said RC-circuit configuration has a time-constant which is in the range of 0.1 time to 3 times of a reciprocal of a frequency of said clock pulses from said pulse oscillator.

13. A switching regulator comprising:
    a switching circuit for switching a transmission of an input voltage to an output terminal;
    a control circuit connected to said switching device for sending a control pulse signal to said switching circuit, so that said switching circuit switches said transmission of said input voltage on the basis of said control pulse signal;
    a pulse width varying circuit connected to said control circuit for varying a pulse width of said control pulse signal from said control circuit; and
    a smoothing circuit connected between said switching circuit and said output terminal for smoothing an output from said switching circuit to send a smoothed output to said output terminal.

14. A switching regulator:
    a switching circuit for switching a transmission of an input voltage to an output terminal;
    a control circuit connected to said switching device for sending a control pulse signal to said switching circuit, so that said switching circuit switches said transmission of said input voltage on the basis of said control pulse signal, wherein said control circuit has a comparator having a first input terminal receiving a reference voltage and a second input terminal receiving a comparative voltage for comparison of said reference voltage and said comparative voltage;
    a pulse width varying circuit connected to said control circuit for varying a pulse width of said control pulse signal from said control circuit, wherein said pulse width varying circuit comprises a ripple supplying circuit connected to one of said first and second input terminals of said comparator for supplying a ripple to said control circuit in order to vary said pulse width of said control pulse signal from said control circuit, and said ripple supplying circuit has a RC-circuit configuration for generating RC-charge/discharge operations which generate said ripple; and
    a smoothing circuit connected between said switching circuit and said output terminal for smoothing an output from said switching circuit to send a smoothed output to said output terminal.

15. The switching regulator as claimed in claim 14, wherein said control circuit has a pulse oscillator connected to said ripple supplying circuit for sending clock pulses through said ripple supplying circuit to said one of said first and second input terminals of said comparator.

16. The switching regulator as claimed in claim 15, wherein said ripple supplying circuit is connected between said one of said first and second input terminals of said comparator and a reference voltage supplying circuit for supplying said reference voltage, so that said reference voltage is supplied through said ripple circuit to said comparator.

17. The switching regulator as claimed in claim 16, wherein said ripple supplying circuit comprises:
- a series connection of first and second capacitors between said pulse oscillator and a ground line, so that an intermediate point of said first and second capacitors is connected to said one of said first and second input terminals of said comparator; and
- a resistance connected between said reference voltage supplying circuit and said an intermediate point of said first and second capacitors.

18. The switching regulator as claimed in claim 15, wherein said ripple supplying circuit is connected between said one of said first and second input terminals of said comparator and an output point of a voltage dividing circuit connected to said output terminal, so that an output signal appearing at said output terminal is fed back through said ripple supplying circuit to said comparator.

19. The switching regulator as claimed in claim 18, wherein said ripple supplying circuit comprises:
- a series connection of first and second capacitors between said pulse oscillator and a ground line, so that an intermediate point of said first and second capacitors is connected to said one of said first and second input terminals of said comparator; and
- a resistance connected between said output point of said dividing circuit and said intermediate point of said first and second capacitors.

20. The switching regulator as claimed in claim 15, wherein said ripple supplying circuit with said RC-circuit configuration has a time-constant which is in the range of 0.1 time to 3 times of a reciprocal of a frequency of said clock pulses from said pulse oscillator.

21. The switching regulator as claimed in claim 14, wherein said control circuit has:
- a pulse oscillator for generating clock pulses; and
- a logic gate having a first input terminal connected to said pulse oscillator and a second input terminal connected to an output of said comparator and a single output terminal connected to said switching circuit for sending said control pulse signal to said switching circuit and also connected through said ripple supplying circuit to said one of said first and second input terminals of said comparator.

22. The switching regulator as claimed in claim 21, wherein said ripple supplying circuit comprises:
- a series connection of first and second capacitors between said output terminal of said logic gate and a ground line, so that an intermediate point of said first and second capacitors is connected to said one of said first and second input terminals of said comparator; and
- a resistance connected between a reference voltage supplying circuit for supplying said reference voltage and said intermediate point of said first and second capacitors.

23. The switching regulator as claimed in claim 22, wherein said logic gate comprises an AND-gate.

24. The switching regulator as claimed in claim 21, wherein said ripple supplying circuit with said RC-circuit configuration has a time-constant which is in the range of 0.1 time to 3 times of a reciprocal of a frequency of said clock pulses from said pulse oscillator.

* * * * *